US012663648B2

(12) United States Patent
Degen et al.

(10) Patent No.: US 12,663,648 B2
(45) Date of Patent: Jun. 23, 2026

(54) WAVEFRONT MANIPULATOR FOR A HEAD-UP DISPLAY, OPTICAL ARRANGEMENT, AND HEAD-UP DISPLAY

(71) Applicant: Carl Zeiss Jena GmbH, Jena (DE)

(72) Inventors: Artur Degen, Jena (DE); Adrian Grewe, Jena (DE); Roman Kleindienst, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 302 days.

(21) Appl. No.: 18/282,217

(22) PCT Filed: Feb. 15, 2022

(86) PCT No.: PCT/EP2022/053574

§ 371 (c)(1),
(2) Date: Sep. 14, 2023

(87) PCT Pub. No.: WO2022/194466

PCT Pub. Date: Sep. 22, 2022

(65) Prior Publication Data

US 2024/0160018 A1 May 16, 2024

(30) Foreign Application Priority Data

Mar. 16, 2021 (DE) .......................... 102021106433.3

(51) Int. Cl.
*G02B 27/01* (2006.01)
*G02B 27/00* (2006.01)
*G02B 27/09* (2006.01)

(52) U.S. Cl.
CPC ..... *G02B 27/0172* (2013.01); *G02B 27/0012* (2013.01); *G02B 27/0103* (2013.01); *G02B 27/0938* (2013.01); *G02B 2027/0125* (2013.01)

(58) Field of Classification Search
CPC ............ G02B 27/0172; G02B 27/0012; G02B 27/0103; G02B 27/0938; G02B 2027/0125

(Continued)

(56) References Cited

U.S. PATENT DOCUMENTS

2008/0068296 A1 3/2008 Lind et al.
2008/0136061 A1 6/2008 Peterson et al.

(Continued)

FOREIGN PATENT DOCUMENTS

DE 102004012032 A1 9/2005
DE 102018213061 A1 1/2020
EP 0321149 A2 6/1989

OTHER PUBLICATIONS

International Search Report rendered by the International Searching Authority for PCT/EP2022/053574, dated May 24, 2022, 2 pages.

(Continued)

*Primary Examiner* — William Choi
(74) *Attorney, Agent, or Firm* — Skaar Ulbrich Macari, P.A.

(57) ABSTRACT

A wavefront manipulator can be arranged in the beam path of a head-up display between a projection lens and a curved projection surface having a number of fixed characteristics. The wavefront manipulator can include a plurality of optical elements with different representational functions, each representational function at least partly correcting an aberration caused by at least one fixed characteristic of the curved projection surface.

17 Claims, 8 Drawing Sheets

(58) Field of Classification Search
USPC .......................................................... 359/630
See application file for complete search history.

(56) References Cited

U.S. PATENT DOCUMENTS

| | | |
|---|---|---|
| 2018/0314065 A1 | 11/2018 | Li |
| 2021/0088786 A1 | 3/2021 | von Spiegel et al. |
| 2022/0091417 A1 | 3/2022 | Toyoshima |

OTHER PUBLICATIONS

International Preliminary Report on Patentability rendered by the International Bureau of WIPO for PCT/EP2022/053574, dated Sep. 28, 2023, 9 pages.
Zemax OpticStudio 20.3 User Manual, Sep. 2020, 2515 pages.

WAVEFRONT MANIPULATOR FOR A HEAD-UP DISPLAY, OPTICAL ARRANGEMENT, AND HEAD-UP DISPLAY

PRIORITY

This application claims the benefit of German Patent Application No. 10 2021 106 433.3, filed on Mar. 16, 2021, which is hereby incorporated herein by reference in its entirety.

FIELD

The present invention relates to a wavefront manipulator to be arranged in the beam path of a head-up display (HUD) between a projection lens and a curved projection surface. The invention furthermore relates to an optical arrangement and to a head-up display.

BACKGROUND

Head-up displays are now used in a wide range of applications, including in connection with viewing windows of vehicles, for example on windshields of motor vehicles, windshields or viewing windows of aircraft, helicopters or ships. These viewing windows, and in particular windshields, usually have a curved surface which is used as a projection surface of head-up displays.

A head-up display usually comprises a projector, a projection surface, an eyebox and a virtual image plane. A representation of an image is generated by means of the projector. The image representation is projected onto the projection surface and is projected from the projection surface into the eyebox. The eyebox is a plane or a spatial region in which the projected image representation is perceptible to a viewer as a virtual image. The virtual image plane, that is to say the plane on which the virtual image is generated, is arranged on or behind the projection surface.

The curvature of the projection surface causes imaging errors or aberrations. If a head-up display is used in conjunction with a curved windshield or a curved viewing window, it is desirable to correct imaging errors in the optical beam path caused by the curvature. A windshield can generally be described as a free-form surface. The basic shape of the windshield can be considered here as a torus. The imaging errors or aberrations that may occur here are defocus, tilt, astigmatism, curvature of the image plane, spherical aberrations, higher astigmatism and coma. The order in which the possible imaging errors are mentioned above corresponds to the size or extent of their occurrence.

In the case of a projection system, the imaging errors and aberrations mentioned are corrected in the projector. In the case of a head-up display, in principle corresponding corrections can be made throughout the entire system, preferably at certain points in the optical system. Head-up displays are often equipped with a planar pupil expander. This is a device for widening the beam path, wherein the pupil of the optical arrangement is enlarged. The pupil may be a real pupil, for example a pupil formed by a stop, or a virtual pupil. The pupil can be enlarged in particular by means of a waveguide, wherein an input coupling surface of the beam path into the waveguide is smaller than an output coupling surface of the beam path from the waveguide.

SUMMARY

An object herein is to provide an advantageous wavefront manipulator to be arranged in the beam path of a head-up display between a projection lens and a curved projection surface, which in particular at least partially corrects imaging errors caused by the curved projection surface. Further objects include providing an advantageous optical arrangement for a head-up display on a curved projection surface, and also an advantageous head-up display.

The wavefront manipulator according to certain embodiments is designed to be arranged in the beam path of a head-up display between a projection lens and a curved projection surface. The projection lens may be part of an imaging unit. The curved projection surface has fixed characteristics, for example a fixed radius of curvature. In other words, the wavefront manipulator may be an optical correction component for correcting imaging errors for use in a head-up display. The projection lens may comprise a pupil expander, preferably a planar pupil expander. A pupil expander may also be arranged between the projection lens and the wavefront manipulator. The curved projection surface may be the surface of a windshield of a vehicle, for example a motor vehicle, an aircraft, a helicopter or a ship.

The wavefront manipulator according to certain embodiments can include a plurality of optical elements, that is to say at least two optical elements, with differing imaging functions. Each imaging function at least partially corrects at least one imaging error caused by at least one fixed characteristic of the curved projection surface. For this purpose, the imaging functions are made to match at least one fixed characteristic of the curved projection surface. The imaging functions may be designed as wavelength-dependent and/or location-dependent, that is to say dependent on the position of the respective optical element.

Individual imaging errors can be corrected more specifically and more precisely when the correction is made in an already expanded beam path for individual bundles of rays. The closer to the projection surface the correction of individual imaging errors is made, the more precise a field-dependent correction, that is to say a correction that is location-dependent in a plane perpendicular to the optical axis, of individual imaging errors can be made.

The imaging functions may first be determined by suitable simulations. The imaging functions may comprise polynomials. An optical structure for an optical element can then be calculated from an imaging function, so that the optical element implements the specific imaging function. The structure may be a refractive structure, for example, a corresponding surface geometry of an aspherical lens, and/or a diffractive structure.

Optimization of the imaging function or the imaging functions in relation to the correction of imaging errors may initially be restricted to a binary optics approach (see for example: Zemax OpticStudio 20.3 User Manual, September 2020), for example Binary Optic 1. The surface shape and/or the local phase change required to achieve an optimized optical imaging function may be determined by a polynomial approach, such as that known from flat asphere models. For example, the following approach may be used:

$$z = \frac{cr^2}{1 + \sqrt{1 - (1+k)c^2 r^2}} + \alpha_1 r^2 +$$

$$\alpha_2 r^4 + \alpha_3 r^6 + \alpha_4 r^8 + \alpha_5 r^{10} + \alpha_6 r^{12} + \alpha_7 r^{14} + \alpha_8 r^{16}$$

where z represents the surface profile or the surface depression in dependence on a radius r, where $\alpha_i$ are coefficients, c is the curvature $c=1/R$ in relation to the radius of curvature R and k is the conical constant. The phase change or phase profile Φ can be expressed by means of the following polynomial approach:

$$\Phi = M \sum_{i=1}^{N} A_i E_i(x, y)$$

where M is the order of diffraction, N is the number of polynomials in the series, $A_i$ is the coefficient of the ith polynomial and the polynomials $E_i(x,y)$ are power series developments in x and y.

The wavefront manipulator according to certain embodiments has the advantage that it can be arranged between a projection lens or an entrance pupil and the image field, in particular the curved projection surface or the eyebox, and thus offers the possibility of correcting location-dependent imaging errors, in particular in relation to the position in the image field (hereinafter also referred to as the field), with high precision. A correction of imaging errors can thus be made outside the projection lens at a distance from it at a position in the beam path where the beam path is already expanded, and therefore a more specific and precise correction of individual imaging errors is possible than within the projection lens.

In a first example, the plurality of optical elements with differing imaging functions are arranged side by side as segments in a plane perpendicular to an optical axis. The plurality of optical elements may be segments of an optical component which is designed as segmented. Segmentation perpendicular to the optical axis allows location-dependent corrections to be made in an already expanded beam path. In particular, individual segments may be designed for correcting location-dependent specific imaging errors. Since the occurrence and composition of the different imaging errors are field-dependent, that is to say dependent on the position in the image field, the imaging errors at specific field points can be corrected better than before with location-dependent imaging functions of the individual segments. Each segment can thus be designed for correcting the respective field-dependent imaging errors.

In a further example, which can be realized in addition or as an alternative to the variant of segmentation, at least two of the plurality of optical elements are arranged one behind the other in relation to an optical axis in the beam path. In this variant, the individual optical elements are preferably designed analogously to the segments with imaging functions which are designed for correcting location-dependent specific imaging errors. On the one hand, the arrangement of the optical elements one behind the other offers advantages in terms of the use of the available installation space. In addition, a step-by-step correction can be made. This means that different imaging errors that occur at a specific field point or in a specific field area can be corrected one after the other.

Both in this example and in the context of the example of a segmented design, individual optical elements can be arranged tilted in relation to one another and/or designed as tiltable in relation to one another. In other words, each element may comprise a center axis, wherein, in a tilted position, the center axes of different optical elements include an angle greater than 0 degrees. A tilted design or arrangement allows a favorable angle of individual optical elements in relation to the curved projection surface to be set.

In the context of an application of head-up displays in motor vehicles, a projection lens of a head-up display is usually arranged integrated in a console or in a fitting. However, the surface of the console or the fitting does not normally extend parallel to the surface of the windshield, but is arranged tilted in relation thereto. Due to the tilting of the windshield and an output coupling plane of the projection lens in relation to one another, a correction of this tilting is required. Such a correction can be made by means of the wavefront manipulator. In particular, the tilting to be corrected can be corrected here by a tilted arrangement of a number of optical elements of the wavefront manipulator in relation to one another.

In the case of a segmented design, a plurality of segments may be arranged in the form of a matrix, for example in the form of a square matrix. The segments may for example be arranged at least in the form of an n×m matrix, where n is at least three (n≥3) and m is at least three (m≥3). The arrangement can be designed for example in the form of a 3×3 matrix or a 5×5 matrix or a 7×7 matrix or a 3×4 matrix, etc.

Individual imaging functions are preferably designed as field-dependent, that is to say location-dependent and/or are designed as dependent on the radius of curvature of the curved projection surface. This results in a very good error correction.

The plurality of optical elements with differing imaging functions may be designed as refractive and/or diffractive and/or transmissive and/or reflective optical elements. One or more of the optical elements may for example be designed as aspherical lenses. In a further variant, the plurality of optical elements with differing imaging functions may comprise free-form surfaces, for example refractive and/or diffractive free-form surfaces. In addition, or as an alternative, the plurality of optical elements with differing imaging functions may comprise holographic structures, for example at least one hologram or holographic structural elements, and/or at least one Mangin mirror, for example a diffractive Mangin mirror.

Preferably, the wavefront manipulator is configured to bring about a maximum extent of an image point of 90 μm in the half field and/or 120 μm in the full field. The half field is understood as meaning half the extent of the image representation in an image plane, measured perpendicularly to the optical axis from the center of the image. The full field is understood as meaning the full extent of the image representation in an image plane, measured perpendicularly to the optical axis from the center of the image. Thus, an ideal point is mapped onto an image point with a maximum extent, for example a maximum diameter, of 90 μm in the half field and/or of 120 μm in the full field. In more advantageous designs, a restriction of the extent of the individual image points to a maximum of 70 μm is brought about, in particular a maximum of 50 μm, for example a maximum of 25 μm or preferably a maximum of 10 μm, in the half field and/or full field. In the full field, an extent of the individual image points of a maximum of 90 μm is also advantageous.

Preferably, the wavefront manipulator is configured to produce an Airy disk with an extent of less than 25 micrometers. In other words, it is designed such that the size of the Airy disk or diffraction disk, that is to say the extent (e.g. the diameter) of a diffraction-limited image point (spot) of an object point of extent 0, is less than 25 micrometers (25 μm), for example 23 micrometers (23 μm). The limitation of the extent of the individual image points can be specified in relation to the extent of the Airy disk, for example by means of the quotient of the extent of the achieved image point and the extent, in particular the diameter, of the Airy disk. In the case of a diameter of the Airy disk of 23 micrometers and a diameter of an image point of 90 micrometers, a diameter of the image point equal to 3.9 times the diameter of the Airy disk is obtained. The wavefront manipulator is preferably designed to bring about an extent of an image point to less than 4 times the extent of the Airy disk in the half field and/or to less than 5.5 times the extent of the Airy disk in the full field. A substantial range of the imaging error correction is achieved by the described restriction of the extent of the image points, with in particular spherical aberrations, coma, astigmatism and defocus also being at least reduced by the restriction of the extent of the image points.

Furthermore, the wavefront manipulator may have a field of view (FOV) of at least +/−7.5 degrees by +/−4 degrees, preferably at least +/−12 degrees by +/−6 degrees. In addition, the wavefront manipulator may be designed to generate an eyebox of an extent in a plane perpendicular to the optical axis of the eyebox of at least 120 millimeters by at least 60 millimeters (120 mm×60 mm), preferably at least 150 millimeters by at least 150 millimeters (150 mm×150 mm).

With the help of a segmented wavefront manipulator, a reduction of the size of the image point (spot size) of an ideal object point by 20 to 30 percent can be achieved for example with just one segmented component for both a transmissive and a reflective design or arrangement. A very good diffraction-limited correction can already be achieved with two optical elements with differing imaging functions, in particular if at least one of the elements is arranged tilted in the direction of the curved projection surface, for example the windshield.

The optical arrangement according to certain embodiments for a head-up display on a curved projection surface, for example a windshield of a vehicle with a curved projection surface, can include a projection lens, for example with a planar pupil expander. The optical arrangement can include a wavefront manipulator according as disclosed herein. The wavefront manipulator is preferably arranged in the beam path at a fixed distance in the direction of a curved projection surface of a pupil expander, for example at least 0.1 millimeter, in particular between 0.1 millimeter and 500 millimeters. The pupil expander is preferably arranged in the beam path between the projection lens and the wavefront manipulator. The light is thus coupled out from the pupil expander in the direction of the wavefront manipulator. The wavefront manipulator may therefore also be arranged spatially between the pupil expander and the projection lens, in particular if the pupil expander is designed as transmissive.

The optical arrangement has the advantage that it can at least partially correct imaging errors caused by the curvature of the projection surface. In this case, the optical arrangement can have the features, properties and advantages already mentioned above in connection with the wavefront manipulator in certain embodiments. An eyebox of an extent in a plane perpendicular to the optical axis of the eyebox of at least 120 millimeters by at least 60 millimeters (120 mm×60 mm), preferably at least 150 millimeters by at least 150 millimeters (150 mm×150 mm) can be generated.

In an advantageous example, a waveguide is arranged in the beam path between the projection lens and the wavefront manipulator. The waveguide is advantageously designed as a pupil expander. By means of the waveguide, it is possible, for example when using the optical arrangement within a motor vehicle, to take into account installation space-specific special features and to ensure a space-saving positioning of the optical arrangement without affecting the quality of the optical image representation.

At least one of the plurality of the optical elements may be arranged in the beam path in front of and/or behind the waveguide. This allows the imaging error correction to be optimized in an efficient manner in terms of the installation space.

The head-up display according to certain embodiments includes a curved projection surface. The head-up display includes an optical arrangement as disclosed herein. It has the features, properties and advantages already mentioned above. The curved projection surface may for example have a radius of curvature of between 300 millimeters and 10 000 millimeters, for example between 3000 millimeters and 7000 millimeters, in particular between 4000 millimeters and 6000 millimeters. The curved projection surface is preferably a surface of a windshield of a vehicle or a surface of a viewing window.

Preferably, the wavefront manipulator is arranged in relation to the optical axis at a distance $d_2$ of between 100 millimeters and 1000 millimeters (100 mm≤$d_2$≤1000 mm), in particular between 250 millimeters and 500 millimeters (250 mm≤$d_2$≤500 mm), from the curved projection surface. In addition or as an alternative, a distance $d_3$ between the curved projection surface and an eyebox, that is to say a plane or a spatial area in which the image representation projected onto the projection surface is perceptible to a viewer as a virtual image, of between 300 millimeters and 1000 millimeters (300 mm≤$d_3$≤1000 mm), in particular between 600 millimeters and 700 millimeters (600 mm≤$d_3$≤700 mm), is preferably provided, for example at a distance of 650 millimeters.

In a further example variant, the head-up display includes in the region of the curved projection surface an optical axis, which indicates the direction of incidence of light waves onto the curved projection surface. The optical elements each have a center axis. The curved projection surface has in the region of an intersection with the optical axis a surface normal which includes an angle of between 0 degrees and 90 degrees with the center axis of a surface of at least one optical element of the plurality of optical elements of the wavefront manipulator that is facing the curved projection surface. In other words, the optical element of the wavefront manipulator that is facing the curved projection surface is thus arranged tilted in the direction of the curved projection surface, that is to say toward it.

The wavefront manipulator may for example comprise at least two transmissively designed optical elements. In addition, or as an alternative, in the region of the output coupling from the projection lens, the beam path may extend in a direction of propagation away from the curved projection surface and be deflected by means of at least one mirror, for example a Mangin mirror, and optionally guided by a free-form lens in the direction of the curved projection surface.

The disclosed embodiment have the overall advantage that, by means of a wavefront manipulator arranged at a distance from a projection lens, an improved imaging error correction is made possible, with the curvature of a surface on or behind which a virtual image is to be generated by a head-up display being taken into account. This allows the imaging error correction to be made for each individual field segment and optimized in relation to each field segment. In this case, the segmentation of the wavefront manipulator can mediate well between field bundles, so that in this way a very good imaging error correction can be made for the entire eyebox of a head-up display with comparatively little effort.

From a certain size, pupil replication has the effect that the eyebox has a duplicated pupil, which fills the eyebox. By segmenting within the wavefront manipulator, the individual segments can be adapted to a limited number of bundles of rays. This allows for better correction of imaging errors. It is also possible to adapt to different eye pupil positions.

The invention is explained in greater detail below on the basis of exemplary embodiments with reference to the accompanying figures. Although the invention is more specifically illustrated and described in detail by means of the preferred exemplary embodiments, the invention is not restricted by the examples disclosed and other variations can be derived therefrom by a person skilled in the art, without departing from the scope of protection of the invention.

The figures are not necessarily accurate in every detail and to scale, and can be presented in enlarged or reduced form for the purpose of better clarity. For this reason, functional details disclosed here should not be understood as restrictive, but merely to be an illustrative basis that gives guidance to a person skilled in this technical field for using the present invention in various ways.

The expression "and/or" used here, when it is used in a series of two or more elements, means that any of the elements listed can be used alone, or any combination of two or more of the elements listed can be used. If for example a composition containing the components A, B and/or C is described, the composition may contain A alone; B alone; C alone; A and B in combination; A and C in combination; B and C in combination; or A, B, and C in combination.

Figure 1:
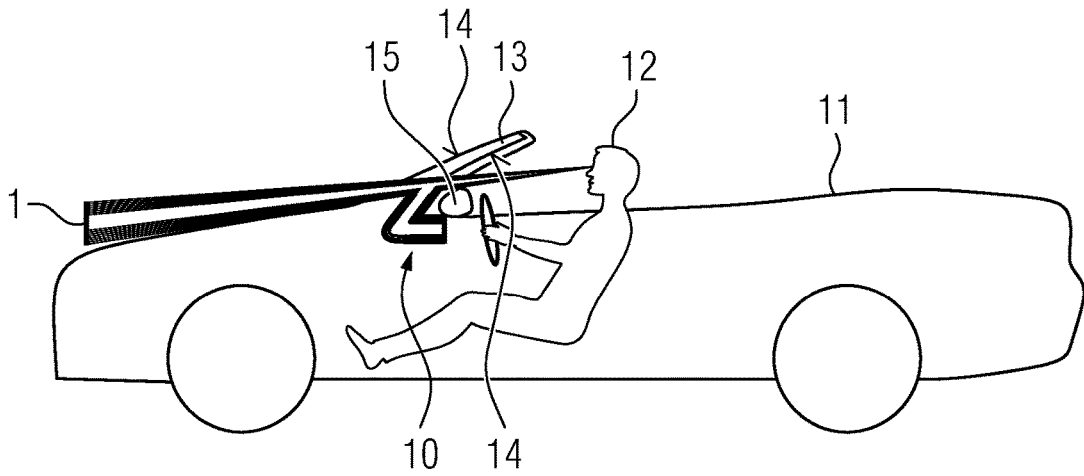
FIG. 1 schematically shows a motor vehicle with a head-up display.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

FIG. 1 schematically shows a motor vehicle 11 with a user sitting therein, for example a driver 12. The motor vehicle 11 comprises a windshield 13 with a curved projection surface 14. In this case, both the outer surface and the inner surface of the windshield 13 are curved, preferably curved to the same extent. A head-up display 10 is arranged integrated in a fitting 15 arranged in front of the user 12. The head-up display 10 is designed such that it generates a virtual image 1 on the surface 14 of the windshield 13 or in front of the surface 14 of the windshield 13 in the direction of travel.

Figure 2:
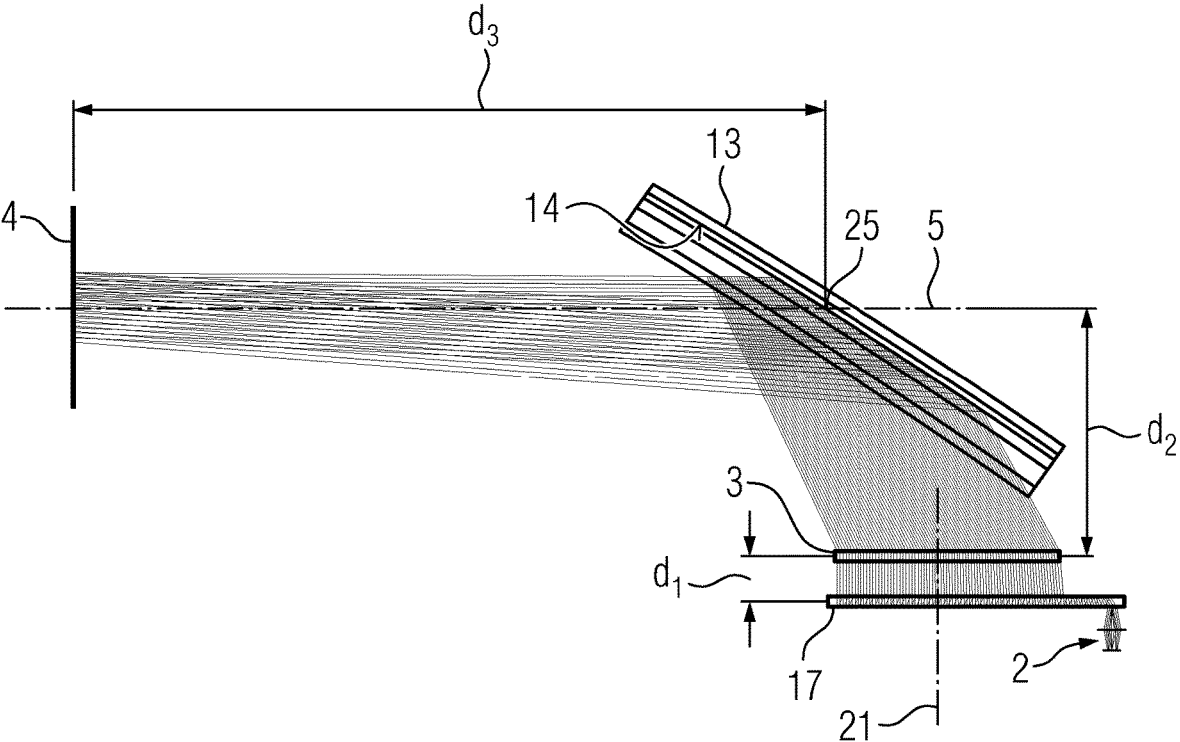
FIG. 2 schematically shows the beam path of the head-up display shown in FIG. 1.

FIG. 2 schematically shows the beam path of a head-up display 10 according to the invention. The head-up display 10 comprises an imaging unit with a projection lens 2, a waveguide 17 designed as a pupil expander and a wavefront manipulator 3 arranged at a fixed, smallest possible, distance $d_1$ from the pupil expander 17. The distance $d_1$ may be at least 0.1 millimeter, in particular between 0.1 mm and 500 mm. The wavefront manipulator 3 may be arranged above or below the pupil expander 17 in the figure. In the case of an arrangement below the pupil expander 17, the pupil expander couples out light downward and the wavefront manipulator 3 reflects the light upward through the pupil expander 17 to the windshield 13.

The wavefront manipulator 3 is arranged at a distance $d_2$ from the projection surface 14 of the windshield 13 in the direction of an optical axis 21 of the wavefront manipulator 3, at an intersection 25 of the projection surface 14 with an optical axis 5 extending in the direction of the eyebox, preferably at a distance of 100 millimeters to 1000 millimeters, for example of 250 millimeters to 500 millimeters. The projection surface 14 may have a radius of curvature of between 300 millimeters and 10 000 millimeters.

Light beams are emitted through the projection lens 2 in the direction of the wavefront manipulator 3. By means of the wavefront manipulator 3, a field-dependent correction of imaging errors which are caused by the curved projection surface 14 of the windshield 13 is made. The wavefront manipulator 3 guides light waves in the direction of the windshield 13 or the curved projection surface 14. At the curved projection surface 14, the light waves are reflected in the direction of an eyebox 4. The eyebox 4 forms here the area in which a user 12 must or can be located in order to be able to perceive the virtual image 1 generated by the head-up display 10. The distance $d_3$ between the eyebox 4 and the curved projection surface 14 in the region of the optical axis 5 preferably lies between 600 millimeters and 700 millimeters.

The eyebox 4 may be of a size of up to 150 mm in width and up to 150 mm in height (150 mm×150 mm), for example a size of 120 mm×60 mm. The imaging functions of the optical elements 8, 9 of the wavefront manipulator 3 may be adapted, in particular optimized, to different eye pupil positions, that is to say different positions within the eyebox 4.

Figures 3, 4:
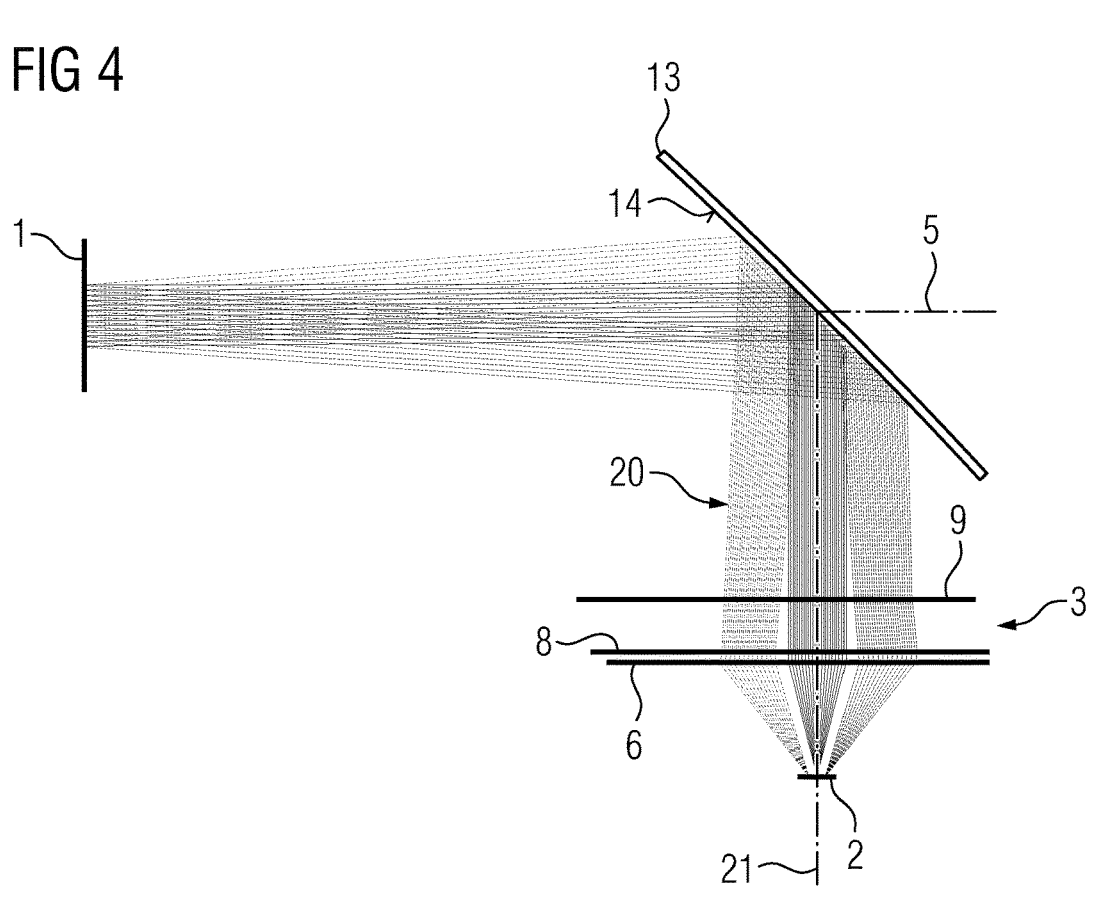
FIG. 3 schematically shows a variant of the embodiment of a head-up display with an optical arrangement according to the invention and a wavefront manipulator, with simulated beam paths being shown.
FIG. 4 schematically shows a further variant of the embodiment of a head-up display with an optical arrangement according to the invention and a wavefront manipulator, with simulated beam paths being shown.

In the variants of the embodiment shown in FIG. 3 ff, the wavefront manipulator 3 in each case optionally comprises an ideal lens 6 and a plurality of optical elements 8 and 9 with differing imaging functions. The individual optical elements 8 and 9 may be designed as segments of an optical component 7 or in each case as individual optical components. In FIG. 3, a segmented design is shown. In FIG. 4, a design of the plurality of optical elements 8 and 9 as separate optical components is shown.

In the variant shown in FIG. 3, starting from the projection lens 2 in the direction of the beam path 20, optionally a lens 6, which is shown here merely for illustrating the purpose of analyzing the basic beam path, is arranged and behind it a segmented optical component 7. The optical axis of the wavefront manipulator 3 is indicated in the figures by the reference numeral 21. The individual segments 8, 9 are arranged within the optical component 7 in a plane perpendicular to the optical axis 21. The individual optical elements 8, 9 are preferably arranged here in the form of a matrix, for example an n×m matrix. In this case m and n are advantageously at least 3. The segments 8, 9 may for example be arranged in the form of a 3×3 matrix, a 5×5 matrix, a 7×7 matrix or in the form of any other matrix arrangement.

Each segment 8, 9, that is to say each of the individual optical elements, has an individual imaging function and at least partially corrects at least one imaging error which is caused by the curvature of the surface 14. The individual imaging functions may for example be designed as wavelength-dependent and/or field-dependent, that is to say location-dependent with regard to the position of the individual optical element 8, 9 in the matrix or more generally location-dependent with regard to the plane of the component 7 perpendicularly to the optical axis 21.

Figure 5:
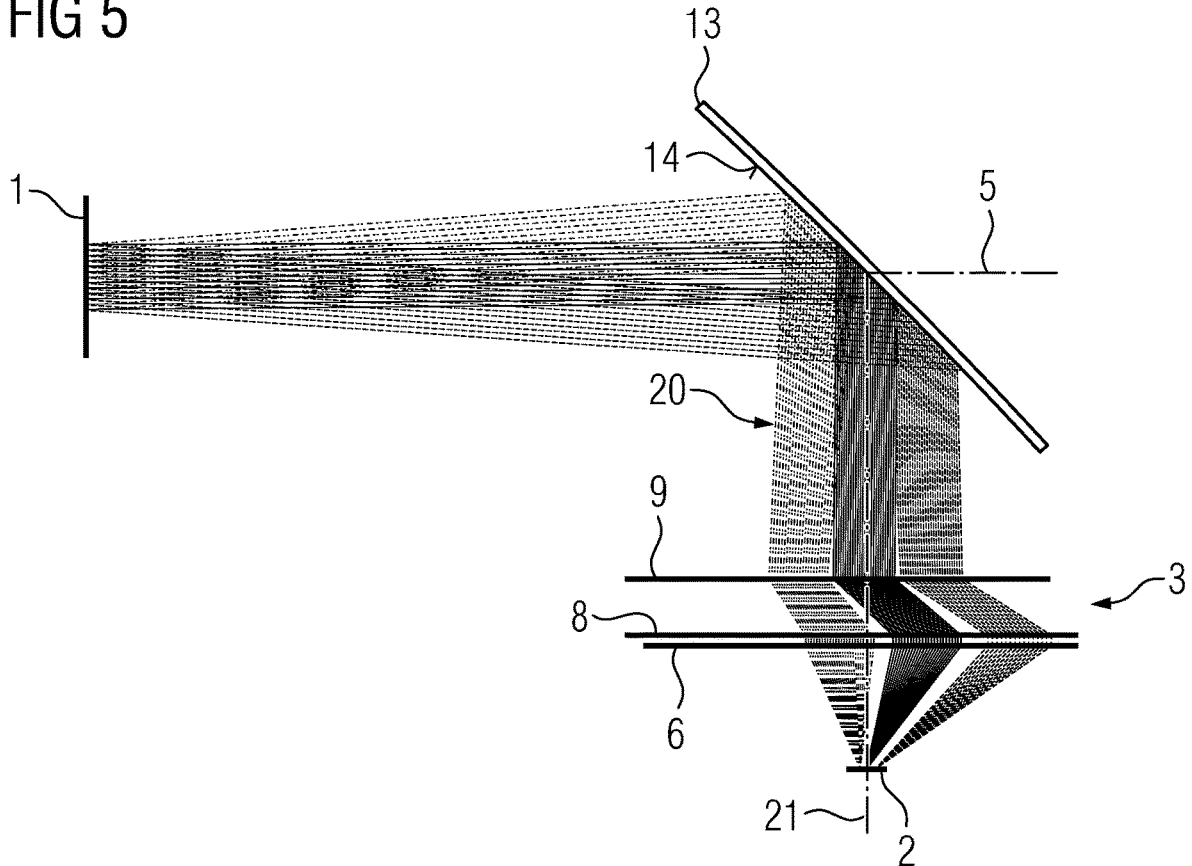
FIG. 5 schematically shows a further variant of the embodiment of a head-up display with an optical arrangement and a wavefront manipulator, with simulated beam paths being shown.
Figure 6:
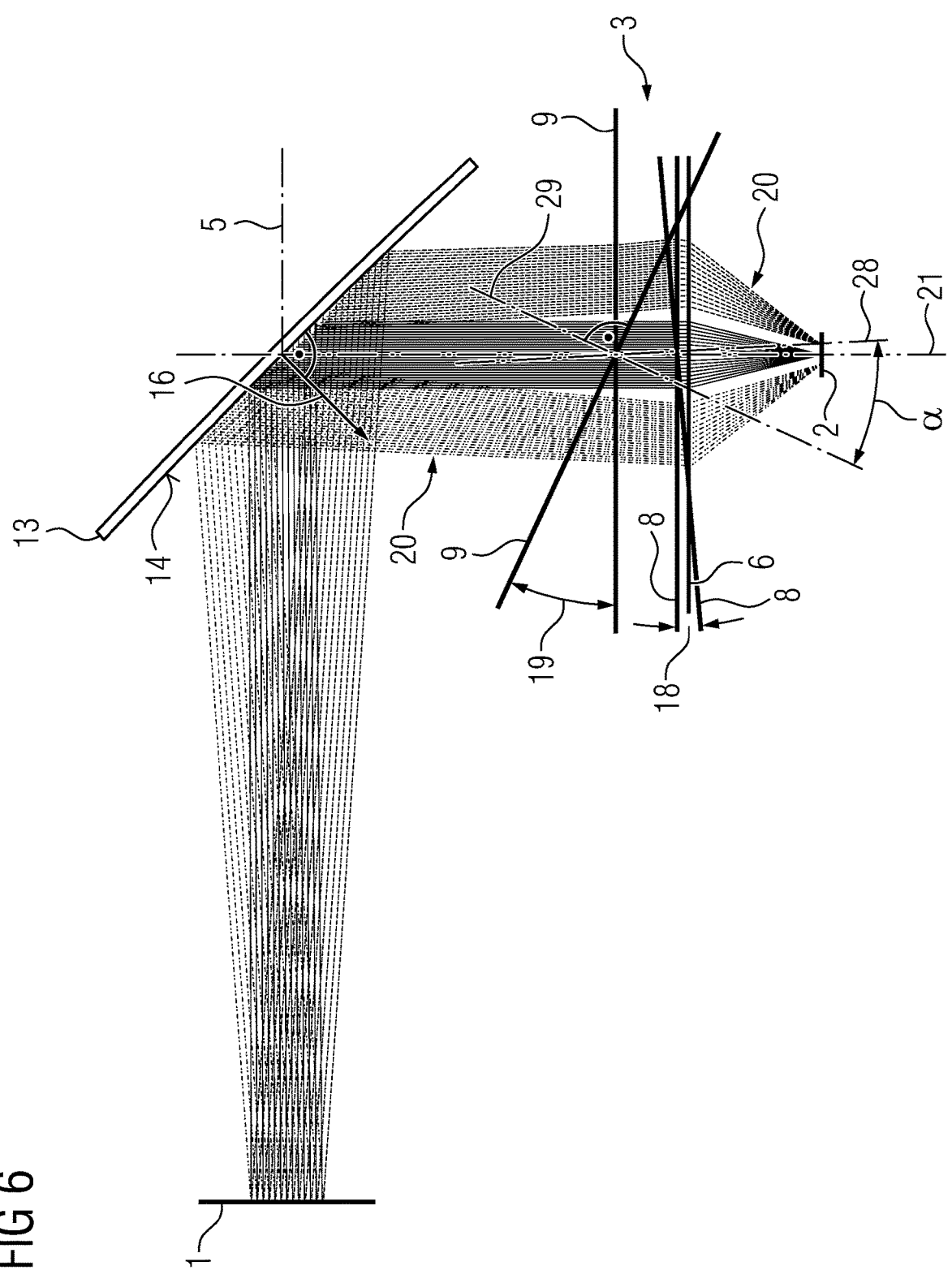
FIG. 6 schematically shows a further variant of a head-up display with an optical arrangement and a wavefront manipulator, with simulated beam paths being shown.

FIGS. 4 to 6 show variants of the design in which there are in each case two optical elements 8 and 9 arranged one behind the other in the beam path 20 in the form of separate components. The individual optical components 8 and 9 may for their part also be designed in each case as segmented perpendicularly to the optical axis 21, thus for example similar to the optical component 7, which has been described in connection with FIG. 3.

In the variants shown in FIGS. 4 and 5, a first optical element 8 and a second optical element 9 are in each case arranged perpendicular to the optical axis 21 and parallel to one another. The optical elements 8 and 9 have differing imaging functions and are designed to correct specific imaging errors caused by the curvature of the surface 14. The use of multiple independent imaging functions allows for accurate, at least partial, correction of a plurality of imaging errors.

In the variant shown in FIG. 5, the imaging functions of the optical elements 8 and 9 cause an extension of the beam path 20. This helps to improve the correction of imaging errors.

In the variant shown in FIG. 6, the optical elements 8 and 9 are arranged tilted in relation to one another. The optical elements 8 and 9 each have a center axis, which is indicated for the optical element 8 by the reference numeral 28 and for the optical element 9 by the reference numeral 29. In the tilted position, the center axes 28 and 29 include an angle α that is greater than 0° and smaller than 180°. In FIG. 6, the optical elements 8 and 9 are shown in each case in a starting position with their center axis 28, 29 parallel to the optical axis 21 and in a tilted position. The tilting angles in relation to the starting positions are indicated by arrows with reference numerals 18 and 19. In this variant of the embodiment, at least one of the optical elements 8 and 9 is in a tilted position.

In the variants of the embodiment shown in FIGS. 7 to 11, there is at least one reflective optical element, for example a mirror, preferably a Mangin mirror, in the wavefront manipulator. In addition, there is a waveguide 17, which is preferably designed as a pupil expander. The waveguide 17 is only schematically indicated in FIGS. 7 to 11, its real position in the beam path is shown schematically in FIGS. 2 and 12. The waveguide 17 may be part of the wavefront manipulator 3. The projection lens 2 and the lens 6 are positioned in FIGS. 7 to 11 shown here merely for illustrating the purpose of analyzing the basic beam path. The figures therefore do not reflect the real spatial arrangement of the components shown, but merely the basic beam path.

The surface 14 of the windshield 13 that is facing the wavefront manipulator 3 has a surface standard 16 in the region of the optical axis 5. The surface normal 16 includes an angle with the center axis 29 of the optical element 9 facing the curved surface 14 of between 0 degrees and 90 degrees. This tilting toward the windshield 13 allows for improved imaging error correction.

Figure 7:
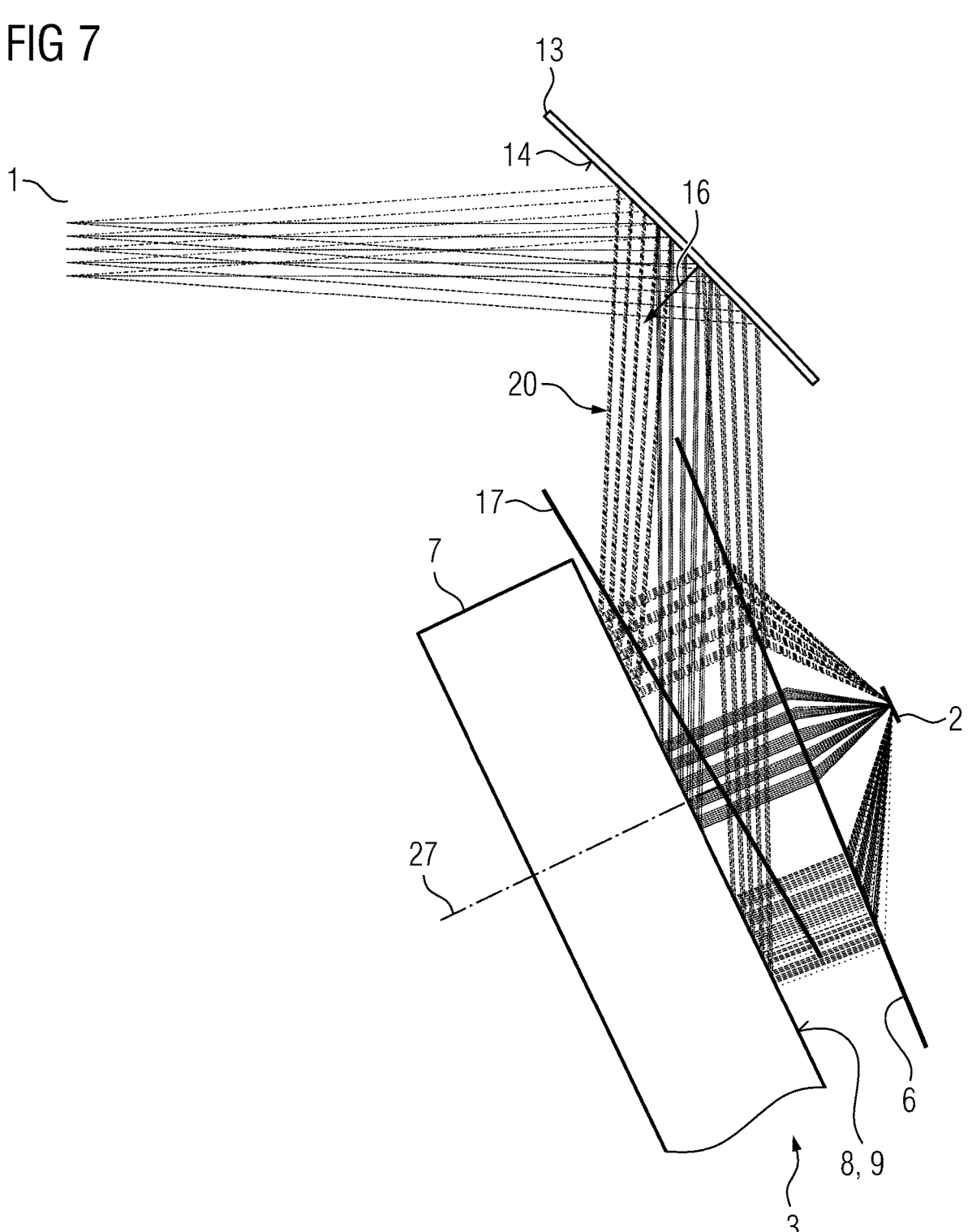
FIG. 7 schematically shows a further variant of a head-up display with an optical arrangement and a wavefront manipulator, with simulated beam paths being shown.

In the variant of the embodiment shown in FIG. 7, the wavefront manipulator 3 comprises a reflectively designed optical component 7 with a center axis 27, which is arranged slightly tilted in relation to the surface normal 16 of the curved projection surface 14 and in relation to the ideal lens 6. A waveguide 17, which is only schematically indicated as a line, is arranged in the beam path 20 between the ideal lens 6 and the reflectively designed optical component 7, that is to say the mirror. In the variant shown in FIG. 8, as a difference from the variant shown in FIG. 7, the reflectively designed optical component 7 is arranged slightly tilted in the other direction in relation to the curved projection surface 14.

Figure 8:
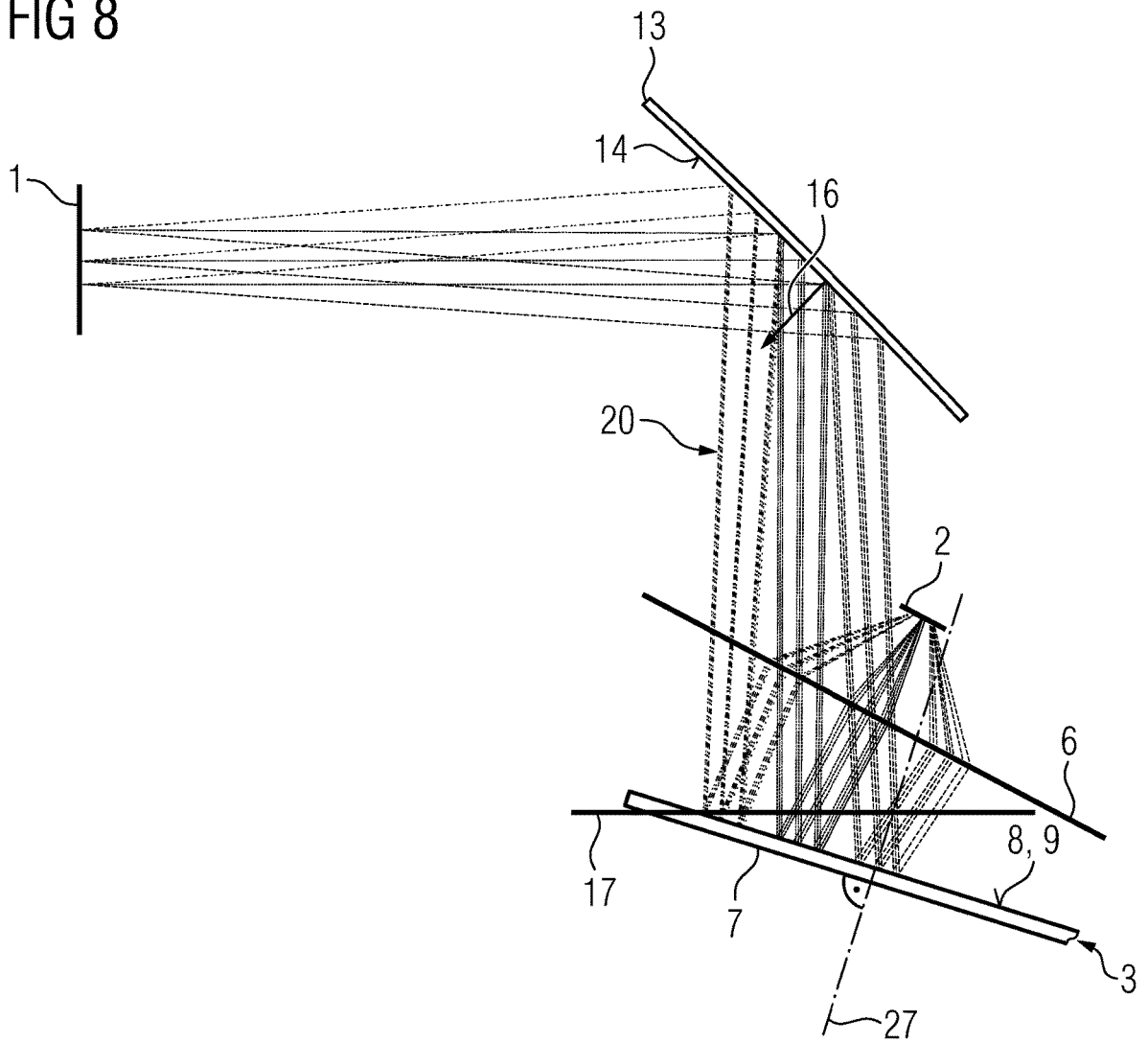
FIG. 8 schematically shows a further variant of a head-up display with an optical arrangement and a wavefront manipulator, with simulated beam paths being shown.

In the variants of the embodiment shown in FIGS. 7 to 11, the ideal lens 6 is not necessarily part of the wavefront manipulator 3. In FIGS. 7 and 8, it may comprise only the reflective optical component 7, that is to say the mirror, which is segmented, and individual optical elements with differing imaging functions. The waveguide 17 may, but does not have to be, part of the wavefront manipulator 3. The same applies to the ideal lens 6.

Figure 9:
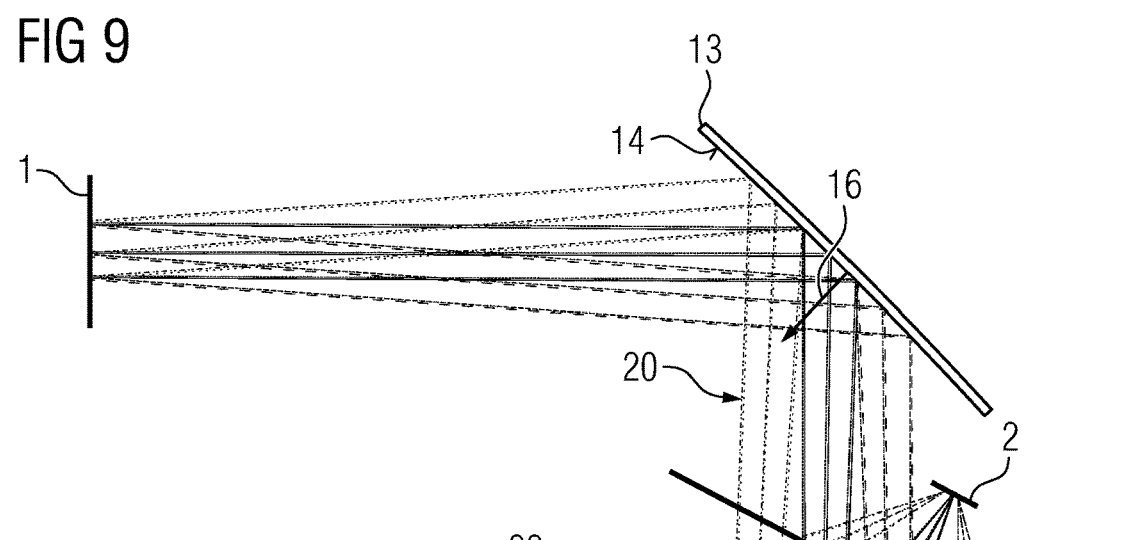
FIG. 9 schematically shows a further variant of a head-up display with an optical arrangement and a wavefront manipulator, with simulated beam paths being shown.
Figure 10:
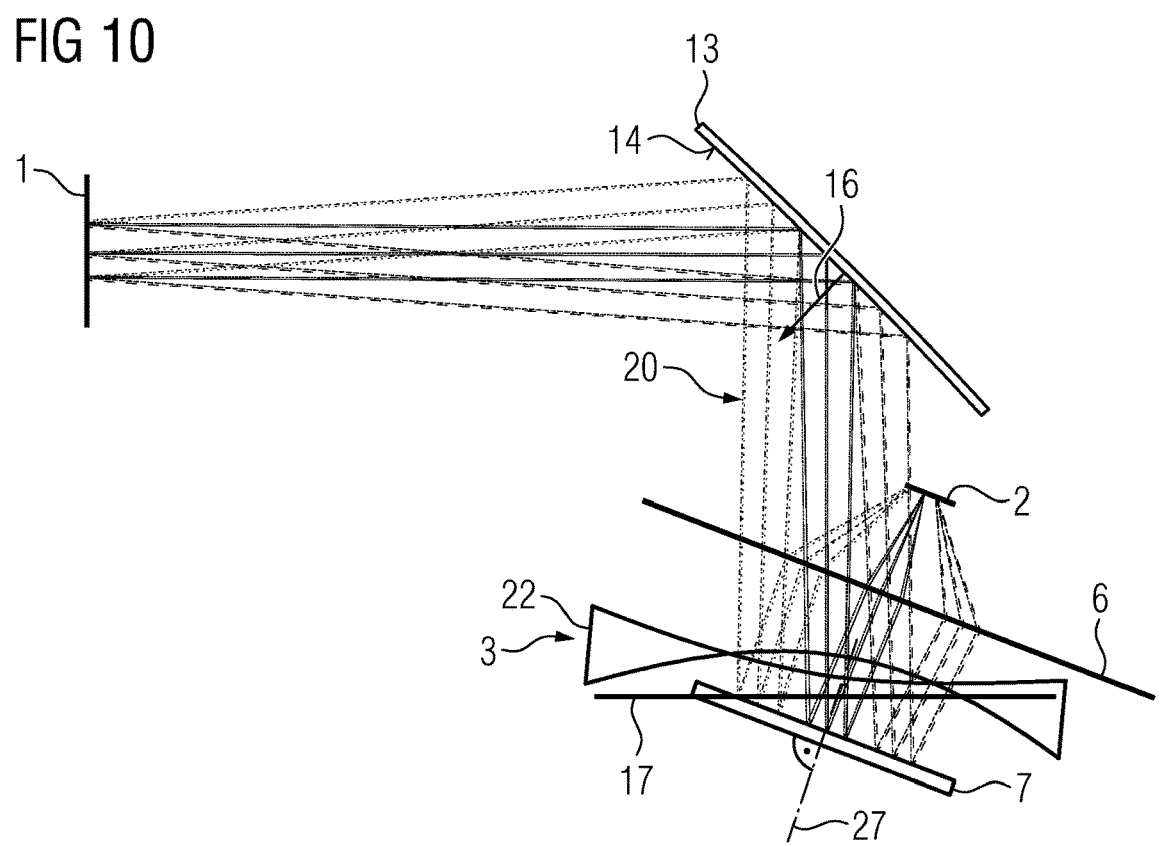
FIG. 10 schematically shows a further variant of a head-up display with an optical arrangement and a wavefront manipulator, with simulated beam paths being shown.
Figure 11:
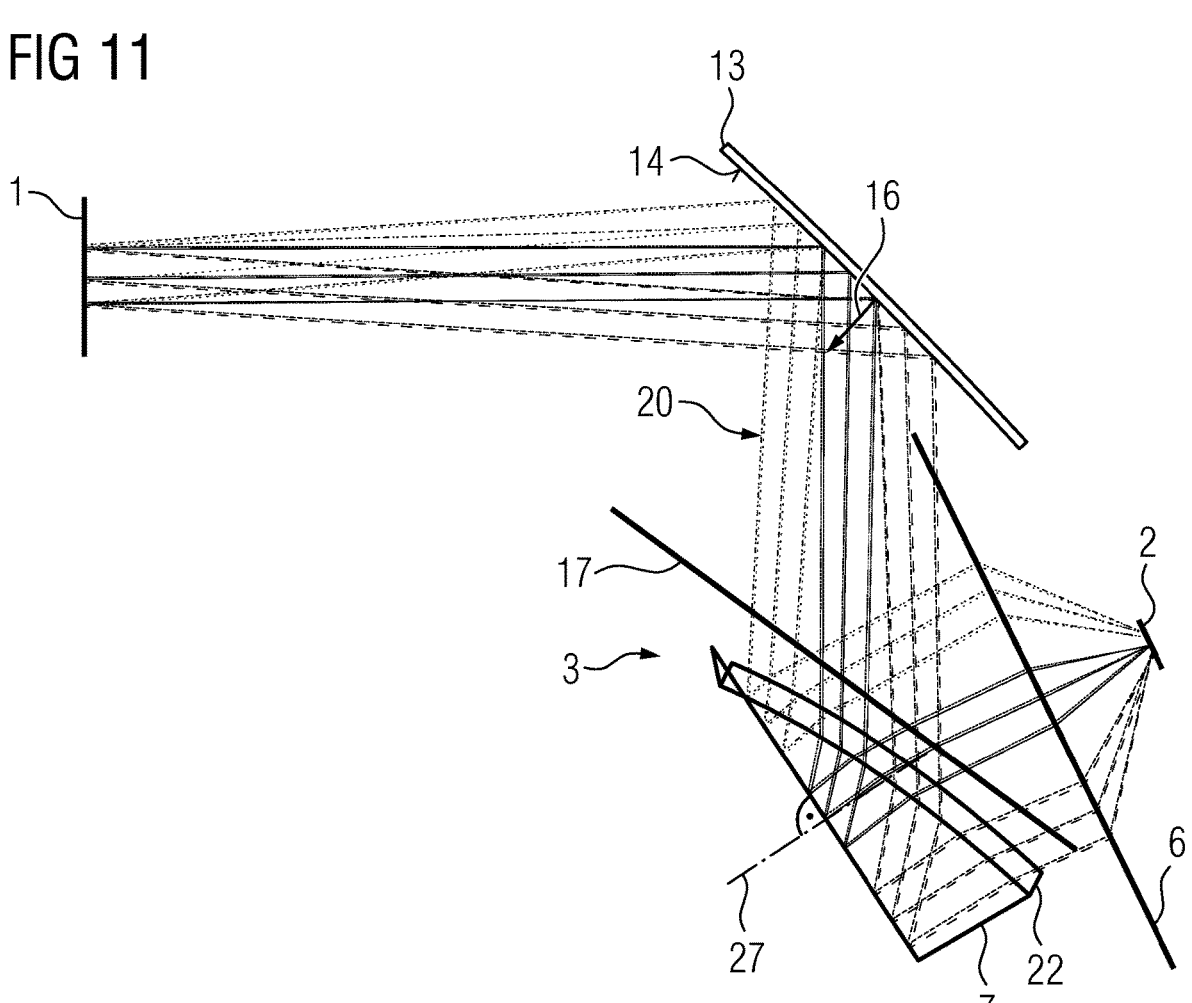
FIG. 11 schematically shows a further variant of a head-up display with an optical arrangement and a wavefront manipulator, with simulated beam paths being shown.

In the variants shown in FIGS. 9 to 11, the wavefront manipulator 3 comprises a reflectively designed optical component 7, which may correspond to a first optical element 8, and at least one asphere 22, which may correspond to a second optical element 9. An asphere is understood as meaning a lens with a rotationally symmetric surface, the surface of which may have surface regions with differing radii of curvature. Differently designed aspheres 22 are shown in FIGS. 9 to 11. The at least one asphere 22 or another optical element may be arranged in the beam path 20 in front of or behind a waveguide 17.

In the variants shown in FIGS. 9 and 10, an asphere 22 is present in each case. The asphere 22 is arranged in the beam path 20 in front of the waveguide 17 and the reflectively designed optical component 7 is arranged behind the waveguide 17. The reflectively designed optical component 7 is arranged tilted by a fixed tilting angle in relation to the curved projection surface 14. In FIG. 11, the asphere 22 and the reflectively designed optical component 7 are arranged in the beam path behind the waveguide 17. In this variant, the waveguide 17 may, but does not necessarily have to be, part of the wavefront manipulator 3. In the variants shown in FIGS. 9 to 11, the reflectively designed optical component 7 and the asphere 22 are arranged tilted in relation to the curved projection surface 14. In addition, the respectively shown asphere 22 is arranged tilted in relation to the reflectively designed optical component 7.

Figure 12:
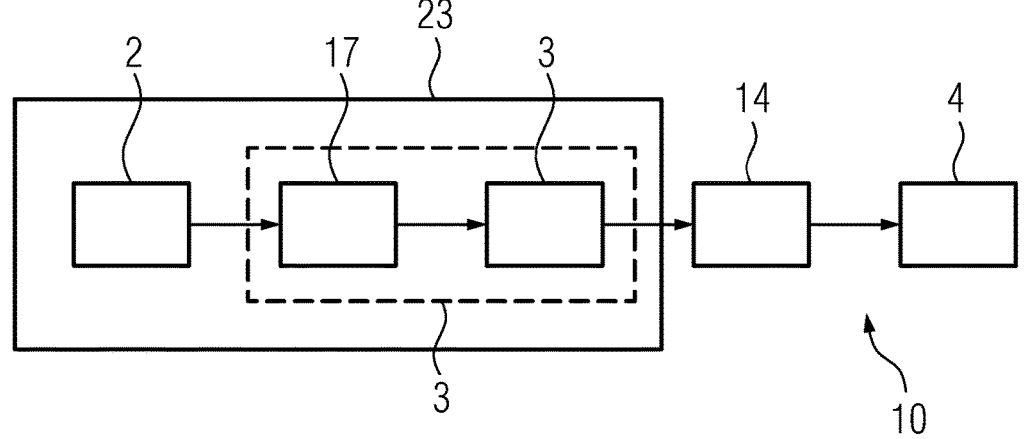
FIG. 12 schematically shows an arrangement of the individual components of a head-up display and an optical arrangement in the beam path in the form of a block diagram.

FIG. 12 schematically shows an arrangement of the individual components of a head-up display 10 according to the invention and an optical arrangement 23 according to the invention in the beam path 20 in the form of a block diagram. Light waves emitted by a projection lens 2 are coupled into a waveguide 17. The light coupled out of the waveguide 17 is guided by means of the wavefront manipulator 3 in the direction of the curved projection surface 14, with imaging errors being corrected. The light reflected at the curved projection surface 14 then reaches the eyebox 4. The wavefront manipulator 3 is constructed as described for example with reference to FIGS. 3 to 11. It may comprise the waveguide 17, in particular the waveguide designed as a pupil expander. This variant is indicated in FIG. 12 by a dashed line. The optical arrangement 23 according to the invention comprises a projection lens 2 and a wavefront manipulator 3, while the wavefront manipulator 3 may, but does not have to, comprise a waveguide 17.

LIST OF REFERENCE SIGNS

1 Virtual image
2 Projection lens
3 Wavefront manipulator
4 Eyebox
5 Optical axis
6 Ideal lens
7 Optical component
8 Optical element
9 Optical element
10 Head-up display
11 Motor vehicle
12 User/driver
13 Windshield
14 Curved projection surface
15 Fitting
16 Surface normal
17 Waveguide/pupil expander
18 Tilting angle
19 Tilting angle
20 Beam path
21 Optical axis of the wavefront manipulator
22 Asphere
23 Optical arrangement
25 Intersection of the optical axis 5 with the curved projection surface 14
27 Center axis
28 Center axis
29 Center axis
$d_1$ Distance
$d_2$ Distance $d_3$ Distance
$\alpha$ Angle

The invention claimed is:

1. A wavefront manipulator that is arranged in a beam path of a head-up display between a projection lens and a curved projection surface with a number of fixed characteristics, the wavefront manipulator comprising:
   a plurality of optical elements with differing imaging functions,
   wherein each imaging function at least partially corrects at least one imaging error caused by at least one fixed characteristic of the curved projection surface.

2. The wavefront manipulator of claim 1, wherein the plurality of optical elements with differing imaging functions are arranged as a plurality of segments in a plane perpendicular to an optical axis.

3. The wavefront manipulator of claim 2, wherein the plurality of segments are arranged in the form of a matrix.

4. The wavefront manipulator of claim 3, wherein the plurality of segments are arranged at least in the form of an n×m matrix, where n is at least 3 and m is at least 3.

5. The wavefront manipulator of claim 1, wherein at least two of the plurality of optical elements are arranged one behind the other in relation to an optical axis in the beam path.

6. The wavefront manipulator of claim 1, wherein at least two of the plurality of optical elements are arranged tilted in relation to one another.

7. The wavefront manipulator of claim 1, wherein the imaging functions depend on a radius of curvature of the curved projection surface and/or are field-dependent.

8. The wavefront manipulator of claim 1, wherein the plurality of optical elements with differing imaging functions are refractive and/or diffractive and/or transmissive and/or reflective optical elements.

9. The wavefront manipulator of claim 1, wherein the plurality of optical elements with differing imaging functions comprise free-form surfaces and/or holographic structures and/or at least one Mangin mirror.

10. The wavefront manipulator of claim 1, wherein the wavefront manipulator is configured to produce an Airy disk with an extent of less than 25 micrometers and/or the wavefront manipulator is configured to bring about an extent of an image point to less than 4 times the extent of the Airy disk in a half field and/or to less than 5.5 times the extent of the Airy disk in a full field.

11. An optical arrangement for a head-up display on a curved projection surface, the optical arrangement comprising:
    a projection lens; and
    a wavefront manipulator arranged in a beam path of the head-up display between the projection lens and the curved projection surface, the curved projection surface comprising a number of fixed characteristics, the wavefront manipulator comprising a plurality of optical elements with differing imaging functions, wherein each imaging function at least partially corrects at least one imaging error caused by at least one fixed characteristic of the curved projection surface.

12. The optical arrangement of claim 11, further comprising a waveguide arranged in the beam path between the projection lens and the wavefront manipulator.

13. The optical arrangement of claim 12, wherein at least one of the plurality of optical elements is arranged in the beam path in front of and/or behind the waveguide.

14. A head-up display, comprising:
    a curved projection surface;

a projection lens; and a wavefront manipulator arranged in a beam path of the head-up display between the projection lens and the curved projection surface, the curved projection surface comprising a number of fixed characteristics, the wavefront manipulator comprising a plurality of optical elements with differing imaging functions, wherein each imaging function at least partially corrects at least one imaging error caused by at least one fixed characteristic of the curved projection surface.

15. The head-up display of claim 14, further comprising an eyebox, wherein the wavefront manipulator is arranged in relation to an optical axis at a distance $d_2$ of 100 millimeters to 1000 millimeters from a curved projection surface and/or a distance $d_3$ between the curved projection surface and an eyebox of between 300 millimeters and 1000 millimeters.

16. The head-up display of claim 14, wherein the curved projection surface has a radius of curvature of between 300 millimeters and 10 000 millimeters.

17. The head-up display of claim 14, wherein the head-up display comprises in the region of the curved projection surface an optical axis, wherein the optical elements each have a center axis, and wherein the curved projection surface has a surface normal in a region of the optical axis, which includes an angle of between 0 degrees and 90 degrees with a center axis of an optical element of the plurality of optical elements of the wavefront manipulator that is facing the curved projection surface.

\* \* \* \* \*